United States Patent
Teran

(10) Patent No.: US 10,451,754 B2
(45) Date of Patent: Oct. 22, 2019

(54) METHOD FOR DETERMINING FORMATION STRESS FIELD USING MICROSEISMIC FOCAL MECHANISMS AND APPLICATIONS THEREFOR TO PREDICT RESERVOIR FORMATION RESPONSE BEFORE DURING AND AFTER HYDRAULIC FRACTURING

(71) Applicant: Microseismic, Inc., Houston, TX (US)

(72) Inventor: Orlando Teran, Houston, TX (US)

(73) Assignee: Microseismic, Inc., Houston, TX (US)

( * ) Notice: Subject to any disclaimer, the term of this patent is extended or adjusted under 35 U.S.C. 154(b) by 406 days.

(21) Appl. No.: 15/453,616

(22) Filed: Mar. 8, 2017

(65) Prior Publication Data
US 2017/0269244 A1    Sep. 21, 2017

Related U.S. Application Data

(60) Provisional application No. 62/311,364, filed on Mar. 21, 2016.

(51) Int. Cl.
| | |
|---|---|
| G06F 19/00 | (2018.01) |
| G01V 1/28 | (2006.01) |
| E21B 41/00 | (2006.01) |
| E21B 43/26 | (2006.01) |
| E21B 49/00 | (2006.01) |
| G01V 1/30 | (2006.01) |

(52) U.S. Cl.
CPC .......... G01V 1/288 (2013.01); E21B 41/0092 (2013.01); E21B 43/26 (2013.01); E21B 49/00 (2013.01); G01V 1/284 (2013.01); G01V 1/306 (2013.01); G01V 2210/1234 (2013.01); G01V 2210/6242 (2013.01); G01V 2210/6246 (2013.01); G01V 2210/646 (2013.01)

(58) Field of Classification Search
CPC .......... G01V 1/288; G01V 2210/1234; G01V 2210/123; E21B 43/26
USPC .......... 702/14, 11, 12, 13, 182–185
See application file for complete search history.

(56) References Cited

U.S. PATENT DOCUMENTS

| | | | | |
|---|---|---|---|---|
| 2009/0299637 A1* | 12/2009 | Dasgupta | ............... | G01V 1/288 702/12 |
| 2013/0201787 A1* | 8/2013 | Vermilye | ................. | G01V 1/42 367/9 |

* cited by examiner

Primary Examiner — Edward Raymond
(74) Attorney, Agent, or Firm — Richard A. Fagin

(57) ABSTRACT

A method for estimating a fluid pressure required to stimulate a subsurface formation includes using seismic signals detected by a plurality of seismic sensors disposed proximate the subsurface formation. Spatial positions and times of origin ("hypocenters") of each of a plurality of microseismic events induced by pumping fluid into the subsurface formation are estimated. Magnitudes and directions of principal stresses are estimated from the hypocenters and from amplitude and phase of the detected seismic signals for each of the microseismic events. Shear and normal stresses of induced fractures are from the estimated principal stresses. A fluid pressure required to cause formation failure on each fracture is estimated using the estimated shear and normal stresses.

13 Claims, 4 Drawing Sheets

METHOD FOR DETERMINING FORMATION STRESS FIELD USING MICROSEISMIC FOCAL MECHANISMS AND APPLICATIONS THEREFOR TO PREDICT RESERVOIR FORMATION RESPONSE BEFORE DURING AND AFTER HYDRAULIC FRACTURING

CROSS REFERENCE TO RELATED APPLICATIONS

Priority is claimed from U.S. Provisional Application No. 62/311,364 filed on Mar. 21, 2016.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of passive seismic evaluation of subsurface formations. More specifically, the disclosure relates to methods for determining subsurface stress fields from seismic events occurring in the subsurface and application of such methods to determining changes in the stress fields induced by activities such as hydraulic fracturing.

Passive seismic evaluation of subsurface formations is used for, among other purposes, determining the origin time and spatial position of microearthquakes (microseismic events) occurring in the subsurface. Example embodiments of such methods are described in U.S. Pat. No. 7,663,970 issued to Duncan et al. and U.S. Pat. No. 8,960,280 issued to McKenna et al.

In general passive seismic methods as descried in the above cited patents include deploying a plurality of seismic sensors above a volume of the Earth's subsurface to be evaluated, and recording detected seismic signals for a selected length of time. The recorded signals may be processed to determine origin time and spatial position (hypocenter) of each seismic event (typically a fracture) that occurs in the subsurface. Determining hypocenters, e.g., during pumping of an hydraulic fracture treatment may enable determining the movement of the fracturing fluid with respect to time. Fracture plane orientation of fractures induced by the hydraulic fracturing may also be determined.

The in-situ stress parameters, i.e. the magnitude and direction of three principal stresses, are key inputs in the design of hydraulic fracturing treatments in unconventional reservoirs. The present disclosure is related to methods for evaluating the stress magnitudes and directions using passive seismic signals.

It is well understood and widely accepted that when injecting hydraulic fracturing fluid into a horizontal well, an induced hydraulic fracture propagates in the direction of the maximum horizontal stress (SHmax), which is the least resistant path to fracture growth. The alignment in time and space of microseismic events can be used to identify the general trend of fracture propagation and thereby obtain a rough estimate of the SHmax direction. However, the accuracy of this method may depend on whether the formation fractures (i.e. natural fractures) are aligned with the SHmax, which may not always be the case. Neither does such method provide any qualitative information on the magnitude of SHmax.

The minimum fracture treatment pressure is a function of stress magnitudes, and more specifically minimum horizontal stress (Shmin). Higher stresses require more fracturing apparatus pump horsepower. Numerical studies along with microseismic observations indicate that the difference between the magnitudes of horizontal stresses, i.e. stress anisotropy, has a considerable impact on the final fracture stimulation pattern, and should be considered when designing the treatment parameters such as stage length and fracturing fluid composition. While density logs and well tests, such as diagnostic fracture injection tests and mini-frac tests are routinely used to estimate the magnitudes of vertical stress and minimum horizontal stress, respectively, there is no direct means available to measure the magnitude of maximum horizontal stress at the fracture treatment depth. It is thus desirable to develop methods to accurately estimate the direction and magnitude of the field maximum horizontal stress using data collected during drilling and completion of the treatment well.

The creation of hydraulic fractures or reactivation of natural fractures changes the stresses within the treatment area. When the fluid pressure inside the hydraulic fracture exceeds the field stress component acting normal to the fracture plane, the fracture will fail and has the potential to dilate and gain width. The amount of fluid pressure required to drive shear failure and dilation depends on the orientation of the fracture plane and the coefficient of friction along the fracture plane in a given stress field.

An estimation of the induced fracture geometry and the variations in the formation stress field can be obtained by mapping the states of stress of the fractures. There is, however, no direct or indirect method to monitor and measure the stimulation-induced stress changes during or after the treatment. It is thus beneficial to develop new methods to estimate and map the stress changes along the well after completion of the well to determine the amount of fluid injection pressures needed to stimulate the rock volume.

DETAILED DESCRIPTION

Figure 1:
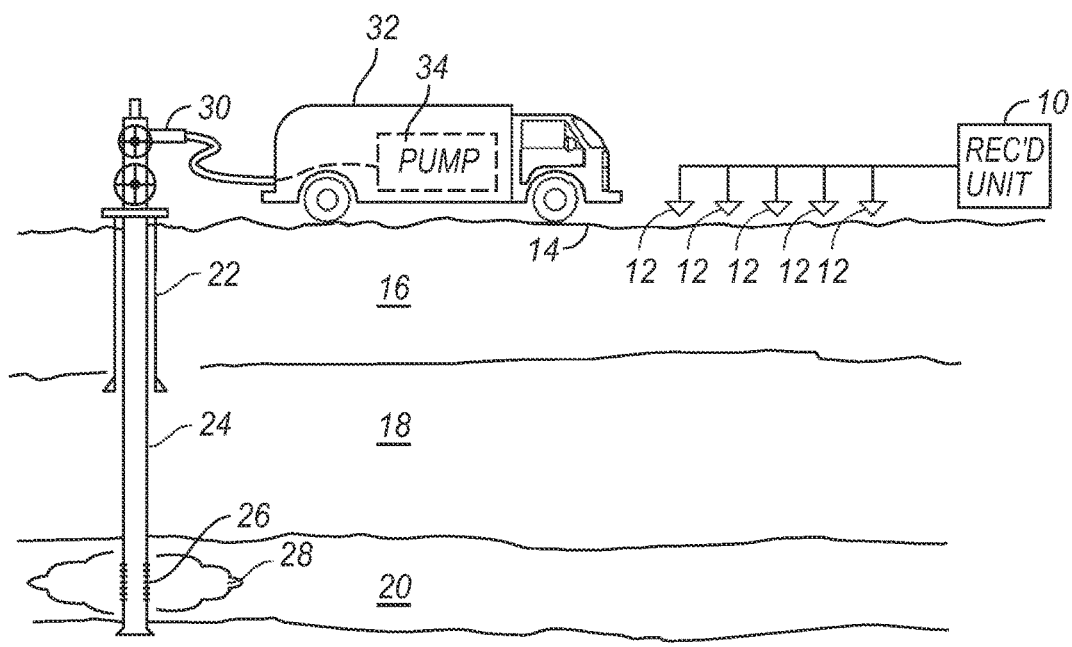
FIG. 1 shows an example arrangement of seismic sensors as they would be used in one application of a method according to the present disclosure.

FIG. 1 shows an example arrangement of seismic sensors as they would be used in one application of a method according to the present disclosure. The embodiment illustrated in FIG. 1 is associated with an application for passive seismic emission tomography known as "frac monitoring." It should be clearly understood that the application illustrated in FIG. 1 is only one possible application of a method according to the invention.

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

While the embodiment shown in FIG. 1 comprises surface deployed seismic sensors, it is within the scope of the present disclosure to use passive seismic signals from one or more sensors disposed beneath the surface, for example, in one or more wells drilled through subsurface formations. An example of a seismic sensor array using seismic sensors disposed in one or more wellbores is described in U.S. Pat. No. 8,705,316 issued to Thornton et al.

Figure 2A:
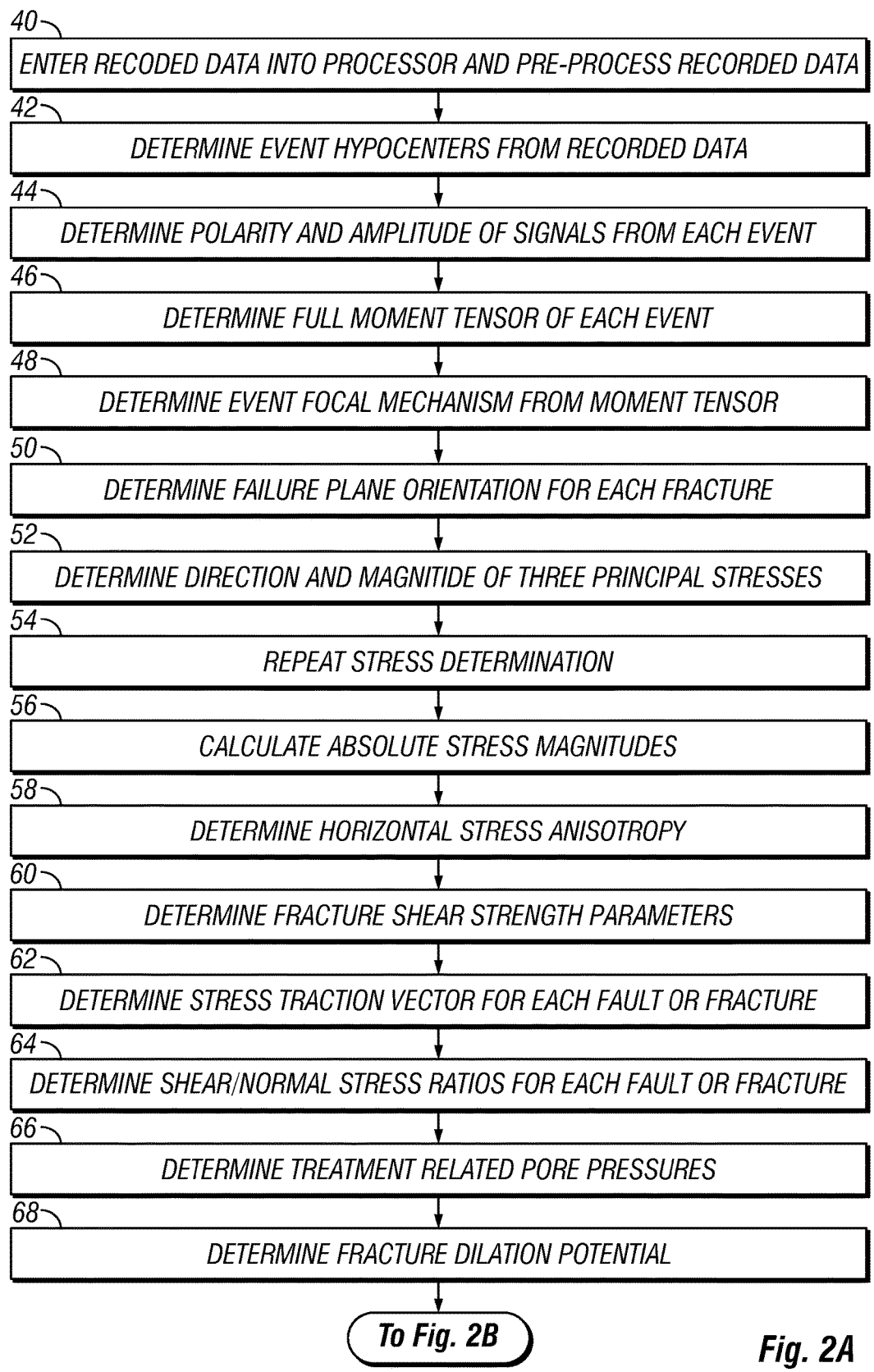
FIGS. 2A and 2B shows a flow chart of an example embodiment of a method according to the present disclosure.

Having explained one type of passive seismic data that may be used with methods according to the present disclosure, methods for processing such seismic data will now be explained. Referring to the flow charts in FIG. 2A and FIG. 2B, the seismic signals recorded from each of the sensors 12 may be entered, at 40 in FIG. 2A, into a processor or general purpose computer or computer system (FIG. 4) and processed first by certain procedures well known in the art of seismic data processing, including the summing described above, and various forms of filtering. In some embodiments, the sensors (12 in FIG. 1) may be arranged in directions substantially along a direction of propagation of acoustic energy that may be generated by the pumping unit (32 in FIG. 1), in the embodiment of FIG. 1 radially outward away from the wellhead (30 in FIG. 1). By such arrangement of the seismic sensors, noise from the pumping unit and similar sources near the wellhead may be attenuated in the seismic signals by frequency-wavenumber (f k) filtering. Other processing techniques for noise reduction and/or signal enhancement will occur to those of ordinary skill in the art.

The hypocenter (origin time and spatial location of occurrence) of each seismic event, such as those induced by the foregoing hydraulic fracturing may be determined, at 42, using the above processed recordings of the signals detected by the seismic sensors (12 in FIG. 1). A non-limiting example of a method for determining hypocenters from passive seismic signals is described in U.S. Pat. No. 7,663,970 issued to Duncan et al. Other methods for determining hypocenters are known to those skilled in the art. For purposes of the present description, the terms "determined" or "calculated" as may be performed in a computer or computer system (FIG. 3) may also be used to mean "estimated" by the computer or computer system.

Once the hypocenters of the seismic events have been determined at 42, an example embodiment of a method according to the present disclosure may include the following actions. First, at 44, the polarity and amplitude of seismic energy arriving first at each sensor as a result of hydraulic fracture induced seismic events may be determined. The polarity and arrival time for each seismic event may be determined by visual observation of recorded signals from each seismic sensor. In other embodiments, the polarity and arrival time may be determined automatically in a computer or processor (FIG. 4). A non-limiting example of an automatic method for selecting polarity and arrival time is described in U.S. Pat. No. 7,978,563 issued to Thornton et al.

After determining arrival time(s) and amplitudes of first arrivals from each induced seismic event, at 46, a full moment tensor may be determined for each induced seismic event. The full moment tensor may be determined using any known inversion technique, including, without limitation, grid-based methods seismic signal waveform fitting, L1 norm and L2 norm minimization, and using seismic signals obtained from within one or more subsurface wells. See, for example, Jechumtalova and Eisner, *Seismic source mechanism inversion from a linear array of receivers reveals non-double-couple seismic events induced by hydraulic fracturing in sedimentary formation*, Tectonophysics 460 (2008) 124-133, Elsevier B. V.

At 48, a focal mechanism for each induced seismic event may be determined from the full moment tensor determined as explained above. Several different non-limiting examples are provided herein for determining the focal mechanism. First, the double couple component of the full moment tensor may be used to determine the focal mechanism. See, for example, M. L. Jost and R. B Herrmann, *A Student's Guide to and Review of Moment Tensors*, Seismological Research Letters, Volume 60, No. 2, April-June, 1989. Focal mechanism may also be determined from a tensile source model. See, for example, Vaclav Vavrycuk, *Inversion Parameters for Tensile Earthquakes*, vol. 106 no. B8, pp. 16,339-16,355, Journal of Geophysical Research (2001), or Vaclav Vavrycuk, *Tensile earthquakes: Theory, modeling, and inversion*, vol. 116, no. B12320, Journal of Geophysical Research (2011). Other example methods for determining the focal mechanism of each induced seismic event may include any other method that derives a focal mechanism by moment tensor decomposition such as in the case of complex fracture geometries where multiple focal mechanisms are needed to describe the full moment tensor. In the case of seismic data obtained from a wellbore wherein seismic signals resulting from both compressional and shear waves may be measured, fitting a focal mechanism to the ratio of the shear-wave and compressional wave amplitudes may be used.

At 50, for each induced seismic event, orientation of a failure plane of a fracture that generated the seismic energy may be determined. Note that for each focal mechanism there are two possible nodal planes (i.e. failure planes) one of which generated the seismic energy. Non-limiting examples of determining fracture plan orientation include, using wellbore imaging measurements, wellbore core samples, using published data on fracture plane orientation in the formation of interest and using measured orientation of fractures in surface expressions (outcrops) of the formation of interest. Other example techniques for determining fracture plane orientation include a technique described in U.S. Pat. No. 8,960,280 issued to McKenna et al. Still other examples may include moment tensor clustering as described in H. Obermaier et al, *Visualization and multivariate clustering of scattered moment tensors*, Information Visualization, 11(1) 43-59, Sage Publishing (2011). It is also possible to select a failure plane using existing knowledge of the stress field or while determining the stress tensor from the focal mechanisms. See, for example, J. W. Gephart et al., *An Improved Method for Determining the Regional Stress Tensor Using Earthquake Focal Mechanism Data: Application to the San Fernando Earthquake Sequence*, Journal of Geophysical Research, vol. 89, No. B11 pp. 9305-9320 (1984). If seismic signals measured in one or more wellbores are used, a facture plane orientation may be determined from a ratio of amplitudes of shear waves with respect to amplitudes of compressional waves.

At 52, direction and relative magnitudes of three principal stresses on the formation of interest may be determined. The principal stresses may be maximum, intermediate and least principal stresses or vertical stress (Sv), maximum (SHmax) and minimum (Shmin) horizontal stresses. Example techniques for determining the relative magnitudes and direction of the stresses may include, without limitation for each induced fracture, performing stress inversion, wherein a common stress tensor best fits a resolved shear stress along the plane of failure and parallel to the direction of movement (i.e. rake) or, equivalently, the zero shear stress direction on the plane of failure in the direction normal to the direction of movement. Other example techniques may include grid search and minimization, as described, for example in the Gephart et al. publication cited above. Other example techniques may include linearized inversions using assumptions and methods as described in Jacques Angelier, *TECTONIC ANALYSIS OF FAULT SLIP DATA SETS*, Journal of Geophysical Research, vol. 89, no. B7, pp. 5835-5848 (1984), Andrew J. Michael, Determination Of Stress From Slip Data: Faults And Folds, Journal of Geophysical Research, vol. 89, no. B13, pp. 11,517-11,526 (1984) among other publications. Simple shear tensor averaging as described in Sperner et al., *FAULT-STRIAE ANALYSIS: A TURBO PASCAL PROGRAM PACKAGE FOR GRAPHICAL PRESENTATION AND REDUCED STRESS TENSOR CALCULATION*, Computers & Geoseiences Vol. 19, No. 9, pp. 1361-1388, (1993) and references cited in the foregoing publication.

Still other methods for determining direction and relative magnitudes of the three principal stresses may include observations of drilling-induced tensile fractures, the width of wellbore "breakouts" and modeling breakout rotations associated with fault slip. It is also possible to use published data, for example, the World Stress Map database.

If inversion results provide stress orientations that are oblique orientation, the direction of SHmax may be determined using, for example, a method described in B. Lund and J. Towend, *Calculating horizontal stress orientations with full or partial knowledge of the tectonic stress tensor*, Geophys. J. Int. 170, 1328-1335 (2007).

At 54, the direction and magnitudes of the three principal stresses may be repeatedly determined, for example, during pumping of single or multiple stage fracture treatment to determine changes therein with respect to spatial position in the subsurface and/or with respect to time. The principal stress directions and magnitudes may be determined as explained above. In some embodiments, clustering analysis of focal mechanisms may be performed, for example, using a method such as stress calculation from heterogeneous fracture orientation, e.g., as described in A. Yamaji, *The multiple inverse method: a new technique to separate stresses from heterogeneous fault-slip data*, Journal of Structural Geology, 22, 441-452 (2000). The principal stresses may be determined in more than one subsurface formation, if desired.

At 56, the absolute stress magnitudes of the three principal stresses may be calculated. Vertical stress may be calculated, e.g., from wellbore bulk density logs integrated from surface to the vertical depth of a formation of interest, wellbore gravity logs and surface gravity measurements. The minimum horizontal stress may be determined from measurements such as mini-frac tests, frac-packs, leak-off tests, or extended leak-off tests. The maximum horizontal stress may be determined using any of the above described inversion methods, or, e.g., from observations of drilling-induced tensile fractures, the width of the wellbore breakouts and/or by modelling breakout rotations associated with slip of faults.

At 58, relative or absolute stress anisotropy may be calculated, e.g., as a difference or ratio between SHmax and Shmin. How the stress anisotropy is related to formation parameters of interest is described, for example, in R. A.

Nelson, Geologic Analysis of Naturally Fractured Reservoirs, Second Edition, Gulf Professional Publishing (2001).

At 60, shear strength parameters of fractures (i.e., cohesion and internal friction angle) may be determined by one of several methods. For example, laboratory testing on samples of the formation may be performed. The shear strength parameters also may be estimated using a method described, for example, in J. Angelier, *From orientation to magnitudes in paleostress determinations using fault slip data*, Journal of Structural Geology, Vol. 11, No. 1/2, pp. 37-50 (1989). The shear strength parameters may be assumed based on other data. See, for example, A. Kohli et al., *Frictional properties of shale reservoir rocks*, Journal of Geophysical Research, Solid Earth, vol. 118, 1-17 (2013). Still other methods may use published data. See, for example, J. Byerlee, *Friction of Rocks*, Pageoph, Vol. 116 (1978), Birkhhäuser Verlag, Basel.

At 62, a stress traction vector in the plane of each fault/fracture may be determined, and the normal and shear traction components may be determined for each fault using the stress tensor determined as explained above and, e.g., tensor transformation laws (e.g., Cauchy's law), graphical methods (see e.g., N. Fry, *Direction of resolved shear stress: a construction and discussion*, Journal of Structural Geology 25 (2003) 903-908) or analytical methods.

At 64, the shear to normal stress ratios are calculated for each fracture plane using the absolute stress magnitudes or the relative stress magnitudes and the shear or tensile strength parameters of the fracture or formation (i.e., fracture or fault reactivation potential) using any of the above procedures and at any scale of observation before, during and after treatment.

At 66, the treatment-related pore pressures (i.e. the minimum pore pressure required for failure) required for stimulating a fracture or fault may be determined using any of the above procedures and at any region and scale of investigation before, during or after pumping a fracture treatment.

At 68, the fracture or fault dilation potential may be determined using any of the above procedures and at any scale of observation before, during and after pumping a fracture treatment.

Figure 2B:
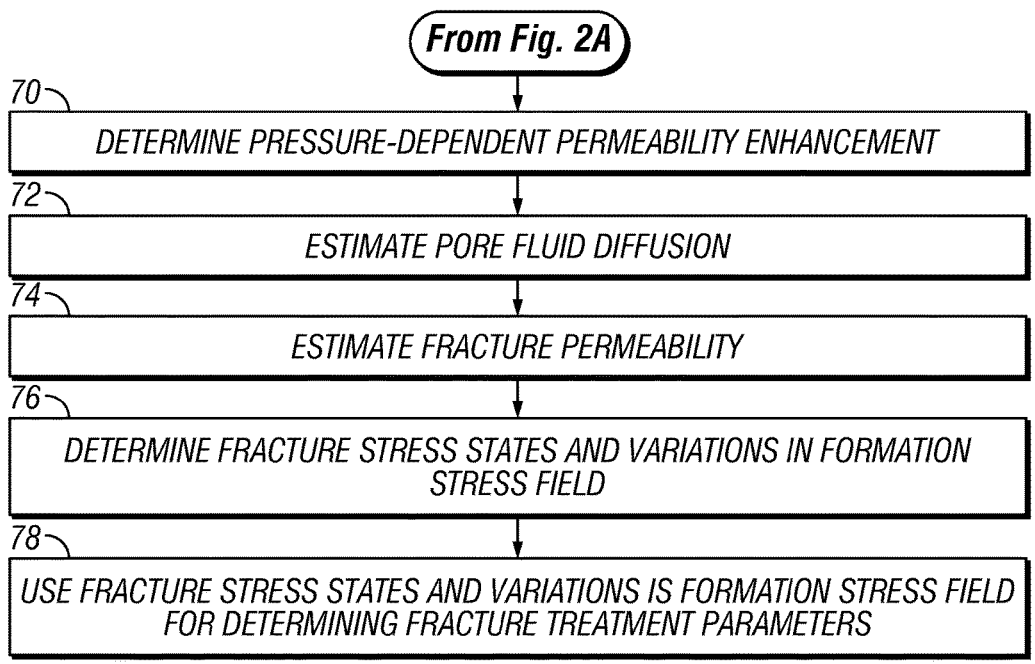

Now referring to FIG. 2B, at 70, the pressure-dependent permeability enhancement may be determined by integrating the above methods with knowledge of the permeability tensor orientation and magnitude. At 72, pore fluid diffusion may be estimated before, during or after pumping a fracture treatment using methods based on those described, for example, in S. M. Hosseini, *Geomechanical Considerations in Seismicity Based Reservoir Characterization*, SPE International, Paper No. 164551 (2013). At 74, the above methods may be used to estimate fracture permeability of any one or more fractures.

At 76, the fracture stress states and the spatial variations in the reservoir stress field calculated as explained above may be used in any known 2 dimensional or 3 dimensional analytic modeling program for calculation of, e.g., stress with respect to fault displacement, fracture propagation during treatment pumping, stability of faults, both induced and naturally occurring and models of fluid production from a fracture treated reservoir formation. See, for example, M. Ki-Bok et al., *Stress-dependent permeability of fractured rock masses: A numerical study*, Lawrence Berkeley National Laboratory (2004) and N. Zangeneh et al., *A Numerical Investigation of Fault Slip Triggered by Hydraulic Fracturing*, Chapter 23, Intech (2013).

At 78, the fracture stress states and spatial variations in the reservoir stress field calculated as explained above may be used for any one or more of the following purposes: optimize treatment design using any of the above methods, comprising using any of the above methods to define or predict wellbore spacing, stage length and spacing, fluid injection rates, total proppant, type of proppant, etc., and in the case of "zipper fracking", defining stage alignment between successive stages in the order of treatment; conditional proppant filling of fractures using any of the above methods; and conditional permeability modeling for reservoir stimulation using any of the above methods.

Figure 3:
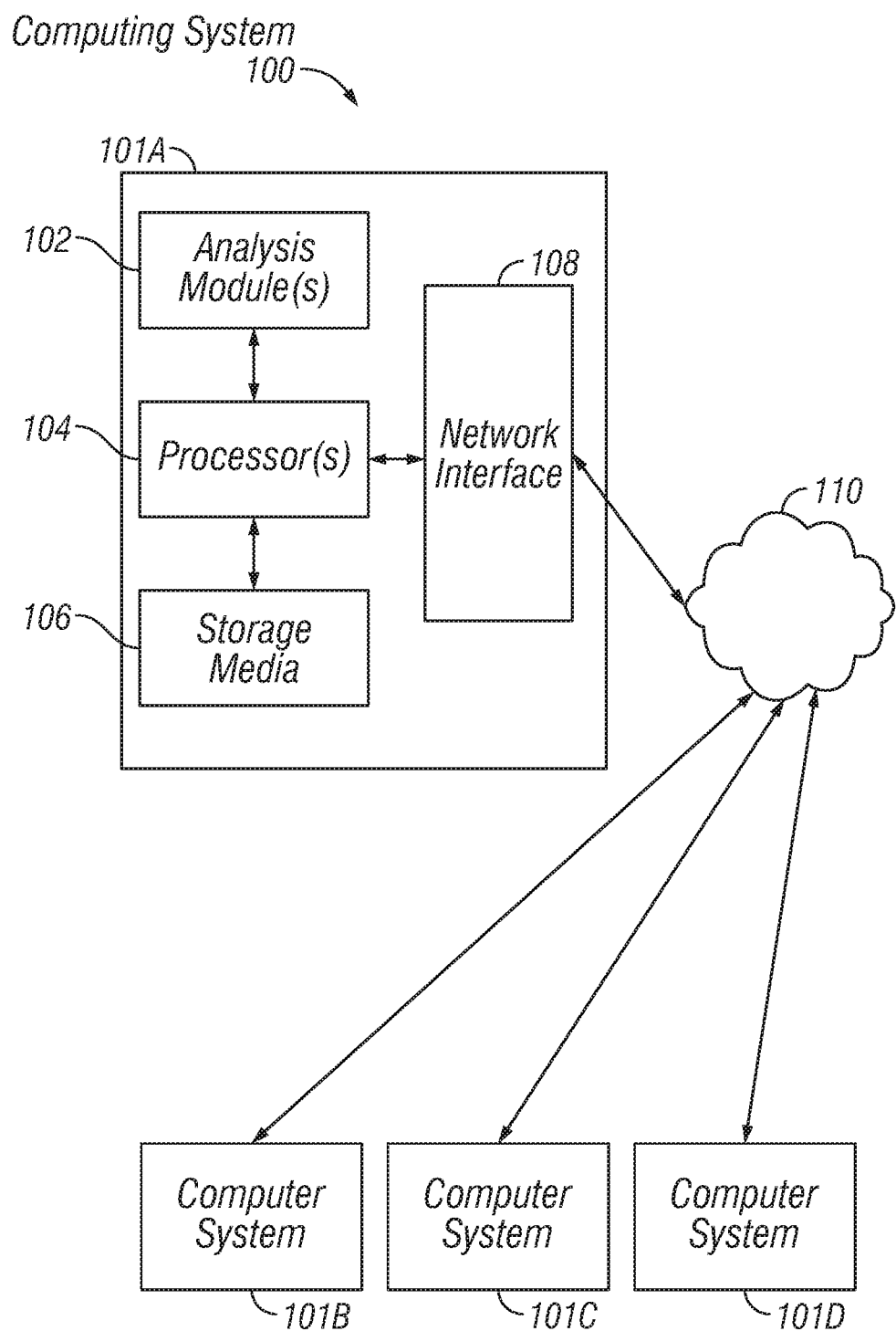
FIG. 3 shows an example computer system than may be used in some embodiments.

FIG. 3 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIG. 2. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A may be at a well location, e.g., in the recording unit (10 in FIG. 1) while in communication with one or more computer systems such as 101B, 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 4 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 3, and/or the computing system 100 may have a different configuration or arrangement of the components shown in FIG. 3. The various components shown in FIG. 3 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating a fluid pressure required to stimulate a subsurface formation, comprising:
    entering into a computer seismic signals detected by a plurality of seismic sensors disposed proximate the subsurface formation;
    in the computer, estimating spatial positions and times of origin ("hypocenters") of each of a plurality of microseismic events induced by pumping fluid into the subsurface formation;
    in the computer, estimating magnitudes and directions of principal stresses from the hypocenters and from amplitude and phase of the detected seismic signals for each of the microseismic events;
    in the computer, estimating shear and normal stresses on fractures in the subsurface formation from the estimated magnitudes and directions of principal stresses; and
    in the computer, estimating a fluid pressure that causes formation failure on fractures using the estimated shear and normal stresses.

2. The method of claim 1 wherein the principal stresses are determined by estimating, in the computer, a full moment tensor of each microseismic event.

3. The method of claim 2 wherein the shear and normal stresses are determined by estimating, in the computer, a stress traction vector from a stress tensor and by applying a transformation law in the computer to the stress traction vector.

4. The method of claim 3 further comprising in the computer, determining a shear to normal stress ratio and estimating the fluid pressure therefrom.

5. The method of claim 1 further comprising, in the computer, repeating the estimating the fluid pressure and estimating an expected fluid pressure required to induce further microseismic events.

6. The method of claim 1 further comprising, in the computer, estimated a fracture dilation potential from the estimated fluid pressure.

7. The method of claim 6 further comprising, in the computer, estimating a permeability enhancement of the subsurface formation with respect to fluid pressure using the calculated fracture dilation potential.

8. The method of claim 7 further comprising, in the computer, calculating a change to at least one fracture treatment parameter using the calculated permeability enhancement with respect to fluid pressure.

9. A method for optimizing fracture treatment of a subsurface formation, comprising:
    pumping fracturing fluid into the subsurface formation to induce fractures;
    detecting seismic signals generated by the inducted fractures using a plurality of seismic sensors disposed proximate the subsurface formation;
    entering the detected seismic signals into a computer;
    in the computer, estimating spatial positions and times of origin ("hypocenters") of each of a plurality of microseismic events induced by pumping the fracturing fluid into the subsurface formation;
    in the computer, estimating magnitudes and directions of principal stresses from the hypocenters and from amplitude and phase of the detected seismic signals for each of the microseismic events;
    in the computer, estimating shear and normal stresses on fractures in the subsurface formation from the estimated magnitudes and directions of principal stresses;
    in the computer, estimating a fluid pressure that causes formation failure on fractures using the estimated shear and normal stresses;
    estimating a fracture dilation potential from the estimated fluid pressure;
    estimating a permeability enhancement of the subsurface formation with respect to fluid pressure using the estimated fracture dilation potential; and
    in the computer, calculating a change to at least one fracture treatment parameter using a calculated permeability enhancement with respect to fluid pressure.

10. The method of claim 9 wherein the principal stresses are determined by estimating, in the computer, a full moment tensor of each microseismic event.

11. The method of claim 10 wherein the shear and normal stresses are determined by estimating, in the computer, a stress traction vector from a stress tensor and by applying a transformation law in the computer to the stress traction vector.

12. The method of claim 11 further comprising in the computer, determining a shear to normal stress ratio and estimating the fluid pressure therefrom.

13. The method of claim 9 further comprising, in the computer, repeating the estimating the fluid pressure and estimating an expected fluid pressure required to induce further microseismic events.

* * * * *